United States Patent Office 2,934,315
Patented Apr. 26, 1960

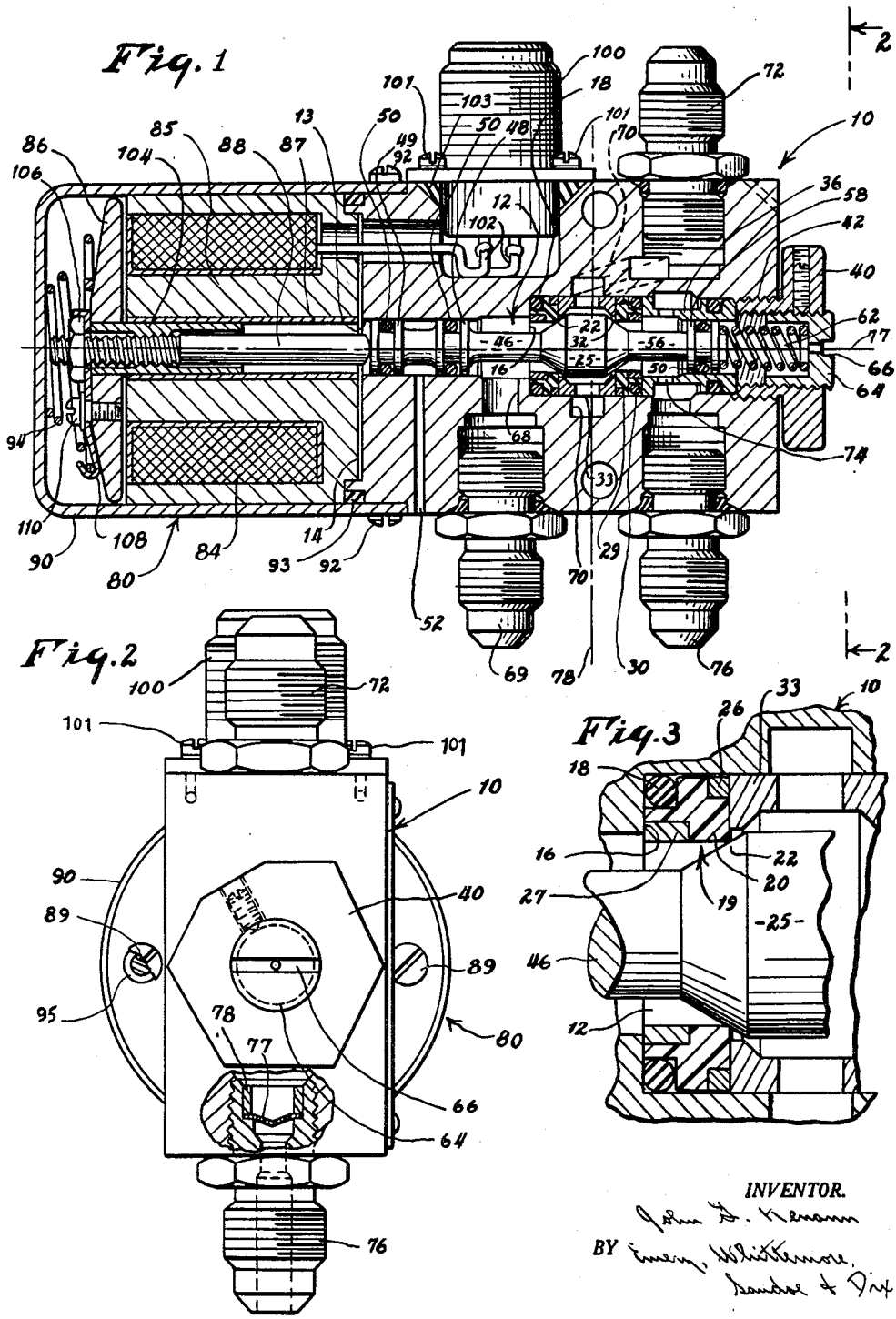

2,934,315

REENFORCED VALVE SEAT

John G. Kenann, Millburn, N.J., assignor to Marotta Valve Corporation, Boonton, N.J., a corporation of New Jersey Application March 27, 1956, Serial No. 574,203

6 Claims. (Cl. 251—362)

This invention relates to improvements in poppet valves, and more especially to a valve construction for sealing relatively high pressure fluids without requiring as much pressure for holding the valve element in closed position.

One object of the invention is to provide a valve with means for closing the valve element with impact against its seat. When so closed, the valve element will seal with much less pressure holding the valve closed than in the case of valve elements which move against their seats without impact. One of the important advantages of reducing the pressure required for holding the valve closed is that the operating mechanism for opening the valve can be of smaller size and of less force, and the valve can be made to operate more quickly.

Another object of the invention is to provide an improved construction for a valve seat assembly which makes practical the use of certain plastic materials which would not otherwise be satisfactory. In accordance with one feature of the invention, a plastic valve seat is reinforced by an outside ring of stronger material, preferably metal, for preventing fatigue cracks that would result from cyclic operation of the valve element wedging into the seat with each repeated opening and closing of the valve. Another feature of the invention provides an inside reinforcement for the seat to prevent distortion or long-term flow of plastic seat material as the result of continued radial components of pressure exerted by the sealing means in the clearance between the outside of the valve seat assembly and the housing in which the assembly is located.

Although intended primarily for use with a plastic valve seat, it will be understood that the invention is also applicable to valve seats made of metal alloys, or any material which is subject to distortion or fatigue in the severe service to which a valve seat is subjected. One outstanding advantage of the invention is that it permits the use of the seat materials which seal effectively at extreme temperatures, but which would not have the necessary strength characteristics for valve seat service unless constructed in accordance with this invention.

Other objects, features and advantages of the invention will appear or be pointed out as the description proceeds.

In the drawing, forming a part hereof, in which like reference characters indicate corresponding parts in all the views:

Figure 1 is a sectional view taken through the longitudinal axis of a three-way valve assembly embodying this invention;

Figure 2 is an end view of the valve assembly shown in Figure 1; and

Figure 3 is an enlarged sectional view of one of the seat assemblies.

In Figure 1 a valve assembly includes a housing 10 in which there is a valve chamber 12. This valve chamber is a part of an opening or bore 13 which extends all the way through the housing 10 from a rearward face 14 of the housing. The bore 13 is cylindrical in cross section, but has different inside diameters along different portions of its length. At one region lengthwise of the bore 13 there is a shoulder 16 with an O-ring 18 and a seat assembly 19 held against the shoulder 16.

This seat assembly 19 includes a seat element 20 (Fig. 3) which is preferably of plastic, and the inside forward portion of this seat element 20 is shaped to provide a seat 22 for a valve element 25. In the construction illustrated, the inside forward corner of the opening through the seat element is rounded to provide the valve seat 22, but wider, tapered seats may be provided, if desired, the seat 22 being merely representative of valve seats against which the valve element 25 may be held to stop flow of fluid through the opening in the seat element 20.

Included in the seat assembly 19 are two reinforcing rings, best shown in Figure 3. These include an outside ring 26, preferably made of metal, such as aluminum, at the same end of the assembly as the seat 22. This reinforcing ring 26 prevents fatigue cracks which might otherwise occur from the cyclic operation with the tapered face of the valve element 25 wedging into the seat.

An inside reinforcing ring 27 is located at the same end of the assembly as the O-ring 18. This reinforcing ring 27, which is also preferably of metal, such as aluminum, prevents distortion of the plastic by the O-ring, or any other inward radial components of pressure resulting from the sealing of the seat assembly against leakage of fluid between the outside of the seat assembly and the inside face of the housing.

There is a similar valve seat assembly 29 (Figure 1) on the other side of the valve element 25 in position to provide a seat 32 for another face of the valve element 25. This valve seat assembly 29 has an O-ring 30.

Seat assemblies 19 and 29 are held in spaced relation to one another by a cage 33; and this cage is long enough to space the seats 22 and 32 further apart than are the portions of the valve element which contact with the seats. Thus the valve element 25 is spaced from one or the other of the seats 22 and 32 at all times.

A retaining sleeve 36 presses the seat assembly 29 against the cage 33 and holds the cage 33 against the seat assembly 19, and the seat assembly 19 against the shoulder 16. The retaining sleeve 36 is in turn clamped in position by a threaded end fitting 40, which screws into threads 42 provided in the forward end of the bore 13.

The valve element 25 has a rearwardly extending stem or extension 46. One end of this extension is of enlarged diameter to provide two pistons 48 and 49. Each of these pistons is packed, and in the construction illustrated, the packing for each piston is an O-ring 50.

There is a vent passage between the packing rings 50 of the pistons 48 and 49, and this vent passage 52 opens through a wall of the housing 10 and provides for the escape of any high-pressure fluid if any high-pressure fluid should leak past the packing of the first piston 48. The spacing between the pistons 48 and 49 is somewhat greater than the maximum travel of the valve element 25, and the pistons 48 and 49 are so located with respect to the vent passage 52 that neither of these pistons 48 and 49 ever crosses or blocks the vent passage 52.

At the forward end of the valve element 25 there is a stem or extension 56 having its forward end of enlarged diameter to provide a counter-balancing piston 58 which is packed, the packing preferably comprising an O-ring 50.

A spring 62 bears against the head of the piston 58 and urges the valve element 25 into contact with the valve seat 22. The spring 62 is preferably helical, and it is compressed between the piston 58 and an adjusting screw 64 having a rearward recess into which the spring 62 extends. This adjusting screw 64 threads into the fitting 40 and has a slot 66 for receiving a tool for turning the screw 64.

By advancing or retracting the screw 64, the pressure of the spring 62 can be adjusted to change the force required to move the valve element 25 away from the seat 22 and into contact with the seat 32, and to change the force with which the spring 62 moves the valve element 25 back against the seat 22 when the force compressing the spring is released.

The spring 62 is preferably made with a high spring rate so that it moves the valve element 25 quickly when the compressing force of the actuator is removed, and so that the valve element moves against the seat 22 with impact. The valve element 25 is moved against the seat 32 also with impact as will be explained herein in connection with the operation of the magnetic actuator.

The impact apparently establishes an intimate contact of the surufaces of the valve element and valve seat which would not be obtained by applying the pressure slowly to the confronting faces. Experience has shown that if the valve element is brought against the valve seat with impact, it will seal against a higher pressure, with the same force holding the valve element closed, than when the valve element is brought against the seat without impact, or the same pressure can be sealed with less force, as previously explained.

A number of passages open through the wall of the housing and communicate with the valve chamber 12. The first of these passages, indicated by the reference character 68, communicates with the valve chamber at a location ahead of the piston 48 and rearward of the valve seat 22. The passage 68 has its outer end portion of enlarged diameter and threaded to receive a fitting 69.

A second passage 70 terminates in an annular recess around the outside of the cage 33 and communicates with the valve chamber 12; between the seats 22 and 32, through angularly spaced openings in the cage. This passage 70 extends through the housing 10 and has an outer portion of increased diameter into which a screened fitting 72 is threaded. A third passage 74 communicates with the valve chamber 12 at a location forward of the valve seat 32 but rearward of the piston 58. This passage 74 has an enlarged outer portion into which threads a fitting 76.

The fittings 69, 72 and 76 are special fittings, each with a screen 77 clamped against a shoulder in the fitting by a bushing 78 secured in the fitting. These screens are to prevent particles from getting into the housing and possibly damaging a valve seat.

The pistons 48 and 49 slide in the bore 13 which serves as bearing means for supporting the valve element 25 from its rearward end. The piston 58 slides in the retaining sleeve 36 which serves as bearing means for supporting the valve element 25 from its forward end. The pistons 48 and 58 are preferably of sufficient diameter to provide counter-balancing pressure for the valve element 25.

Beyond the rearward face 14 of the housing 10, there is a magnetic actuator 80 for operating the valve element. This actuator 80 has a winding 84, a core 85, an armature 86, a sleeve 87 and a plunger 88. The plunger 88 contacts with the rearward face of the piston 49. When the valve element 25 is in contact with the valve seat 22, the armature 86 is spaced from the face of the core 85 by a distance slightly greater than the travel of the valve element.

When energy is supplied to the magnetic actuator, therefore, the armature 86 is attracted to the core and displaces the plunger 88 and valve element 25 toward the front of the valve assembly far enough to bring the valve element into contact with the valve seat 32. This operation of the valve element 25 by the acutator compresses the spring 62 and stores the energy in the spring for returning the valve element 25 to its original position when the supply of energy to the actuator is shut off.

As the gap between the armature 86 and the windings 84 shortens, the pull on the armature increases rapidly and at a rate which more than compensates the increasing compression force of the spring 62. This increasing force brings the valve element against the seat 32 with impact. The length of the operating parts is preferably selected to bring the valve element 25 against the seat 32 before the armature 86 reaches the core 85 and to cause the armature 86 to come into contact with the core when the seat material of the seat assembly 29 has compressed to the desired extent under the closing force.

The magnetic actuator is carried at the rearward end of the housing 10 by the core screws 89 (Fig. 2) and there is a housing or shell 90 enclosing the actuator. This shell 90 is connected to the housing 10 by screws 92 (Fig. 1) or any other suitable fastening means, and is sealed by an O-ring 93 between the shell and the valve housing that supports it so as to prevent dust or any other foreign matter from getting inside this shell 90. The core screws are also sealed with O-rings 95 to prevent any foreign matter from getting inside the solenoid.

A spring 94 is compressed between the armature 86 and the end face of the shell 90. This spring 94 exerts a pressure against the force of the spring 62 but the pressure of the spring 94 is light, compared to the pressure of the spring 62, and the purpose of the spring 94 is merely to prevent vibration of the parts when the valve element is used with equipment that vibrates.

A receptacle 100 is connected to the housing 10 by screws 101 for receiving a plug of a power line. This receptacle 100 is connected with the actuator windings 84 by conductors 102 for supplying power to energize the actuator. The receptacle is sealed by O-ring 103 to prevent any foreign matter from getting inside the actuator.

The position of the valve element 25 when the armature 86 is drawn up against the face of the core 85 can be adjusted by changing the position of the armature 86 longitudinally along the plunger 88. The connection of the armature 86 to the plunger 88 is shown clearly in Figure 1. The rearward end of the plunger 88 is threaded and there is a non-magnetic sleeve 104 rigidly connected to the armature 86 and provided with threads along part of the threaded length of the plunger 88. The armature 86 can be adjusted lengthwise along the plunger 88, therefore, by merely screwing the sleeve 104 along the threads of the plunger.

To prevent the sleeve 104 from turning on the plunger 88, after the desired adjustment has been made, a lock nut 106 is threaded on the plunger 88 adjacent to the rearward end of the armature 86. A clip 108 has an opening through which the plunger 88 extends and the lock nut 106 clamps this clip 108 firmly against the rearward end of the armature 86. A portion of the clip 108 is connected to the armature 86 by a screw 110 extending through an arcuate slot in the clip. Tightening of the screw 110 clamps the clip 108 against the armature 86 and this prevents the clip from turning with respect to the armature 86. The other side of the clip 108 extends up against one of the flat sides of the lock nut 106 to prevent the lock nut from rotating.

From the foregoing it will be apparent that this invention provides an improved valve construction in which the valve element seals fluid with lower pressures holding the valve closed as compared with valve structures of the prior art; and it will be also apparent that the construction of the valve seat of this invention makes possible the use of material which would otherwise be unsuitable for the valve seat, but which are particularly effective for sealing against leakage at extreme temperatures.

In the preferred embodiment of the invention, as illustrated in the drawing, the valve seat is stationary and the valve moves toward and from the seat; but the invention can be modified so as to have the "seat assembly" move toward and from a stationary valve element, it being merely necessary that there be relative movement of the valve element with respect to the seat assembly.

The preferred embodiment of the invention has been illustrated and described, but changes and modifications can be made without departing from the invention as defined in the claims.

What is claimed is:

1. A valve assembly including a housing having a chamber therein, and having a passage through one end of the chamber and a shoulder at that end of the chamber and around said passage, a seat assembly that fits within the chamber, said seat assembly including a seat element made of plastic material subject to cracking under repeated stressing by a valve element, said seat element having a longitudinal passage therethrough, the plastic seat element extending for the full length and radial width of the seat assembly and determining the dimension of said seat assembly, said plastic seat element having annular end faces at both ends thereof, one of which confronts said shoulder of the chamber, clamping means confronting the annular face at the other end of the seat assembly and holding said seat assembly clamped against said shoulder of the chamber, the plastic end face at one end of the seat element having a surface thereof around said longitudinal passage exposed for contact with a tapered face of a valve element, the plastic seat element having a diameter somewhat less than that of the chamber so that the plastic seat element fits freely in the chamber, and means for preventing the plastic seat element from expanding radially and becoming stuck in the chamber including a reinforcing ring of less diameter than the chamber within the axial limits of the seat element and in contact with the plastic material of the seat element and located radially outwardly from the surface with which the valve element contacts and around the entire circumference of said surface for preventing outward displacement and fatigue cracks of the plastic material which would be caused by pressure of the tapered valve element and repeated impacts of said valve element with the plastic material of the seat element, said seat element having a recess in the periphery thereof confronting a surface of the chamber, and resilient sealing means associated with said seat assembly and located in the recess and having an outside diameter at least as great as that of the peripheral surface of the seat element, and in which the plastic seat element also has a reinforcing ring within the radial limits of the plastic seat element and at the inner surface thereof around the longitudinal opening through the seat element and of much shorter length than the seat element but of greater axial length than said recess, the reinforcing ring being located radially inward from the resilient sealing ring for preventing pressure of the sealing ring from displacing the plastic material inwardly.

2. A valve assembly including a housing having a chamber therein, and having a passage through one end of the chamber and a shoulder at that end of the chamber and around said passage, a seat assembly that fits within the chamber, said seat assembly including a plastic seat element with a longitudinal passage therethrough, the plastic seat element extending for the full length and radial width of the seat assembly and determining the dimensions of said seat assembly, said plastic seat element having annular end faces at both ends thereof, one of which confronts said shoulder of the chamber, clamping means confronting the annular face at the other end of the seat assembly and holding said seat assembly clamped against said shoulder of the chamber, the plastic seat element having a groove in the periphery thereof, the plastic seat element having a diameter somewhat less than that of the chamber so that the plastic seat element fits freely in the chamber and with a clearance from the wall of the chamber, and means for preventing leakage of fluid through said clearance including a resilient sealing ring associated with said seat assembly and in the groove and having an outside diameter greater than that of the peripheral surface of the seat element to close said clearance, and compressed against a surface of the chamber in which the seat element is located, the seat assembly including also a reinforcing ring within the radial limits of the plastic seat element and at the inner surface thereof around the longitudinal opening through the seat element and of much shorter length than the seat element but of greater axial length than said groove, the reinforcing ring being located radially inward from the resilient sealing ring for preventing pressure of the sealing ring from displacing the plastic material inwardly.

3. The valve seat assembly described in claim 2 and in which the reinforcing ring is made of metal.

4. The valve assembly described in claim 2 and in which the groove in the periphery of the seat element is at the corner of the seat element adjacent to the shoulder of the chamber, and the sealing ring is compressed against the shoulder as well as against the surface of the chamber around the seat element, and the reinforcing ring extends to the end of the plastic seat element adjacent to the shoulder.

5. A valve assembly including a housing having a valve chamber therein with a wall having a shoulder, a valve seat assembly substantially filling the cross section of the chamber and having one side against the shoulder, the seat assembly being constructed partly of plastic material and having a plastic surface for contact with a tapered face of a valve element when the valve element is in closed position, the seat assembly including reinforcing of different material from the plastic and located around the portion of the plastic surface with which the tapered face of the valve element contacts, the reinforcing being spaced radially outward from said plastic surface for preventing distortion of the plastic by the radial component of the pressure of the tapered face against the seat assembly and in which the assembly includes sealing means confined between a face of the plastic material of the valve seat assembly and a confronting face of the valve chamber, there being a circumferential groove in one of the faces for confining the sealing element against axial displacement, and another reinforcing, of different material from the plastic and located on the side of the plastic opposite the sealing element and being of greater axial extent than the groove, for preventing inward displacement of the plastic by pressure of the sealing element.

6. A valve assembly including a housing in which there is a valve chamber, a shoulder on the inside wall of the valve chamber, a first valve seat assembly having one side against the shoulder, a cage against the other side of the valve seat assembly, resilient sealing means carried by the seat assembly and in contact with the wall of the valve chamber, a second valve seat assembly against the cage at the opposite end of the cage from the first seat assembly, sealing means on the second seat assembly, retaining means clamping the seat assemblies and the cage together and the first seat assembly against the shoulder, each of the seat assemblies including a plastic ring having a center opening therethrough having a surface at one end for contact with a tapered face of a valve element, and reinforcing rings for each of the plastic rings including a metal ring around the plastic ring and located radially outward from the center opening through the plastic ring having the surface that contacts with the tapered seat of the valve element, and a second metal ring within the plastic ring and located radially inward from the resilient sealing means for bracing the assembly from distortion by components of pressure from the sealing means, the second metal ring being of greater axial extent than the resilient sealing means.

References Cited in the file of this patent

UNITED STATES PATENTS

| | | |
|---|---|---|
| 4,338 | Powell | Apr. 11, 1871 |
| 1,949,614 | McDonald | Mar. 6, 1934 |
| 2,151,442 | Roberts et al. | Mar. 21, 1939 |
| 2,201,895 | Glen | May 21, 1940 |
| 2,348,548 | Koehler | May 9, 1944 |
| 2,519,541 | Bryant | Aug. 22, 1950 |
| 2,612,188 | Persons | Sept. 30, 1952 |
| 2,670,922 | Carlisle | Mar. 2, 1954 |
| 2,772,068 | Grove | Nov. 27, 1956 |
| 2,784,737 | Kelly | Mar. 12, 1957 |